US012699591B2

(12) United States Patent
Rosemarine

(10) Patent No.: US 12,699,591 B2
(45) Date of Patent: Aug. 4, 2026

(54) SYSTEM, DEVICES AND/OR PROCESSES FOR SCHEDULING TASKS FOR ONE OR MORE HARDWARE COMPONENTS OF A COMPUTING DEVICE

(71) Applicant: Arm Limited, Cambridge (GB)

(72) Inventor: Elliot Maurice Simon Rosemarine, London (GB)

(73) Assignee: Arm Limited, Cambridge (GB)

( * ) Notice: Subject to any disclaimer, the term of this patent is extended or adjusted under 35 U.S.C. 154(b) by 602 days.

(21) Appl. No.: 18/160,523

(22) Filed: Jan. 27, 2023

(65) Prior Publication Data

US 2024/0256332 A1    Aug. 1, 2024

(51) Int. Cl.
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS

| | | | | |
|---|---|---|---|---|
| 9,128,763 B2 * | 9/2015 | Sarkar | ..................... | G06F 9/505 |
| 9,389,916 B1 * | 7/2016 | Miller | ................. | G06F 11/3017 |
| 9,419,915 B2 * | 8/2016 | Meijer | .................... | H04L 47/70 |
| 9,836,318 B2 * | 12/2017 | Brewerton | .......... | G06F 9/30043 |
| 10,120,724 B2 * | 11/2018 | Badjatia | .................. | H04W 4/24 |
| 10,635,497 B2 * | 4/2020 | Venkataraman | ...... | G06F 9/4881 |
| 10,691,647 B2 * | 6/2020 | Badjatia | ............... | G06F 16/183 |
| 10,749,813 B1 * | 8/2020 | Zhao | .................... | H04L 47/781 |
| 2016/0080282 A1 * | 3/2016 | Meijer | .................. | H04L 69/329 709/226 |
| 2017/0329632 A1 * | 11/2017 | Ma | ......................... | G06F 9/4881 |
| 2018/0321983 A1 * | 11/2018 | Venkataraman | ...... | G06F 9/4881 |

* cited by examiner

*Primary Examiner* — Van H Nguyen

(74) *Attorney, Agent, or Firm* — Berkeley Law & Technology Group, LLP

(57) ABSTRACT

Briefly, example methods, apparatuses, and/or articles of manufacture are disclosed that may facilitate and/or support scheduling tasks for one or more hardware components of a computing device.

18 Claims, 10 Drawing Sheets

900

Allocate, at least in part via execution of a particular job scheduler software component, one or more job slots comprising particular job slot circuitry of a particular hardware component to at least one particular hardware based task control interface (TCI) of one or more hardware-based TCIs for the particular hardware component — 910

Obtain, at least in part via execution of a software component for the at least one particular hardware based TCI, one or more particular job descriptors — 920

Store, at least in part via execution of the software component for the at least one particular hardware based TCI, the obtained one or more particular job descriptors in the respective one or more job slots — 930

Perform, via the particular hardware component, a particular task specified, at least in part, by at least one of the one or more particular job descriptors — 940

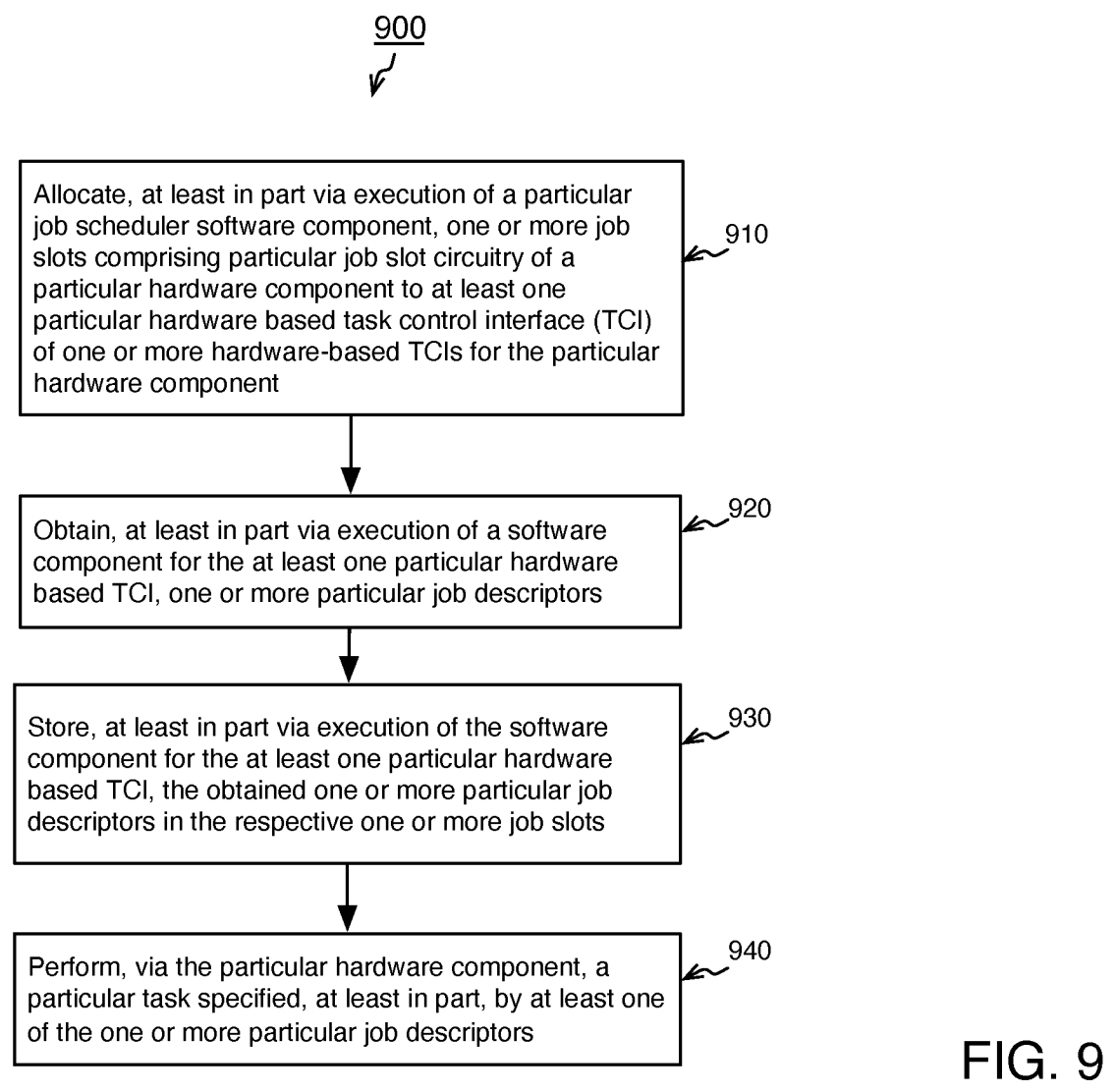

900

910

Allocate, at least in part via execution of a particular job scheduler software component, one or more job slots comprising particular job slot circuitry of a particular hardware component to at least one particular hardware based task control interface (TCI) of one or more hardware-based TCIs for the particular hardware component

920

Obtain, at least in part via execution of a software component for the at least one particular hardware based TCI, one or more particular job descriptors

930

Store, at least in part via execution of the software component for the at least one particular hardware based TCI, the obtained one or more particular job descriptors in the respective one or more job slots

940

Perform, via the particular hardware component, a particular task specified, at least in part, by at least one of the one or more particular job descriptors

FIG. 9

SYSTEM, DEVICES AND/OR PROCESSES FOR SCHEDULING TASKS FOR ONE OR MORE HARDWARE COMPONENTS OF A COMPUTING DEVICE

BACKGROUND

Field

The present disclosure relates generally to systems, devices and/or processes for scheduling tasks for one or more hardware components of a computing device.

Information

Integrated circuit devices, such as processors, for example, may be found in a wide range of electronic device types. Computing devices, for example, may include integrated circuit devices, such as processors, to process signals and/or states representative of diverse content types for a variety of purposes. With an abundance of diverse content being accessible, signal and/or state processing techniques continue to evolve. Many electronic devices, such as any of a wide range of computing device types, may operate, at least in part, in accordance with some form of executable computer program code, such as software and/or firmware. Software compartmentalization may be increasing throughout the computing industry, leading to further development of virtualization technologies to improve security by partitioning a single operating system and its various services, for example.

Additionally, machine learning, for example, is becoming increasingly prevalent throughout the computing industry. Given the above-mentioned increase in software compartmentalization and/or virtualization, it appears that there may be an increasing need to securely schedule tasks for machine learning circuitry, including machine learning accelerators and/or the like, for example. More particularly, there may be an increasing need to securely schedule tasks having a variety of different quality of service (QoS) characteristics. Of course, machine learning accelerators are merely one example of a circuit type for which there may be an increasing need to have tasks securely scheduled and/or to achieve particular QoS characteristics for those tasks. Software developers, circuit designers, system designers and/or others may face challenges in providing such security while ensuring particular QoS characteristics in this evolving computing landscape.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 9 is a flow diagram illustrating an example process for scheduling tasks for a particular hardware component, in accordance with embodiments.

Figure 1:
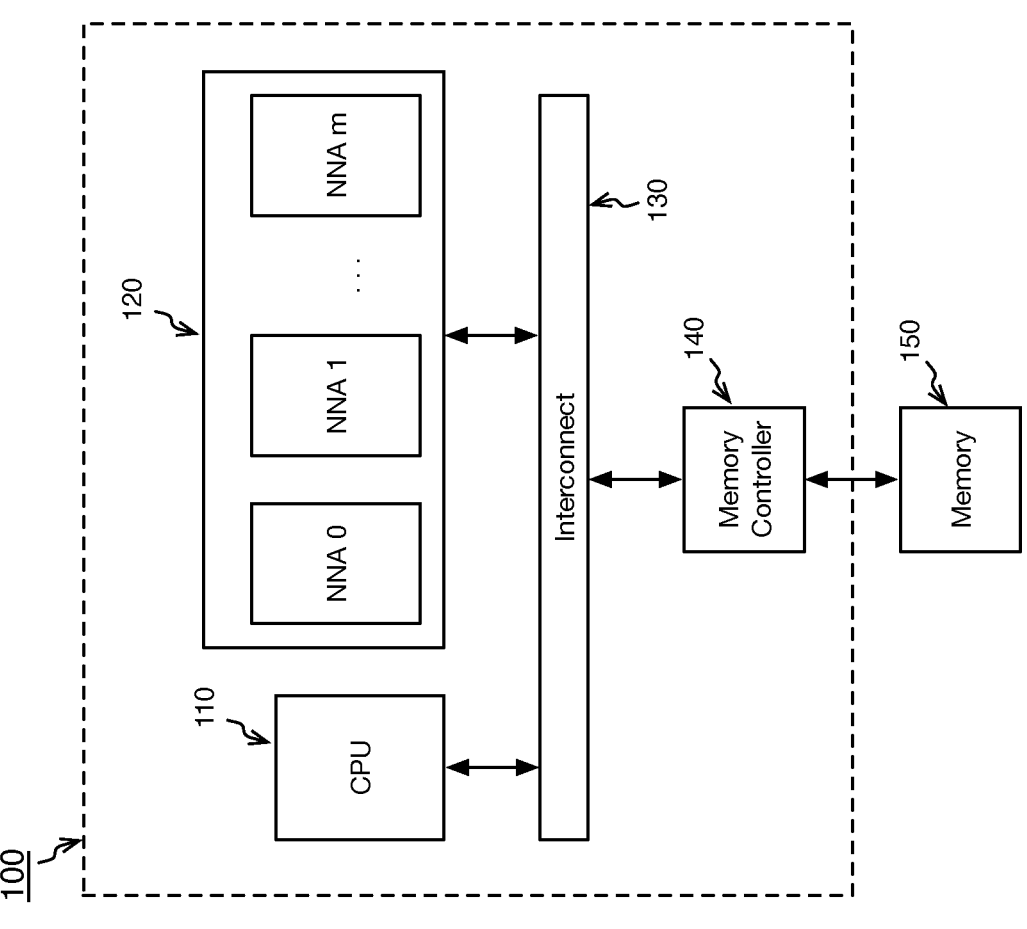
FIG. 1 is a schematic block diagram depicting an example computing device, in accordance with embodiments.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Further, it is to be understood that other embodiments may be utilized. Also, embodiments have been provided of claimed subject matter and it is noted that, as such, those illustrative embodiments are inventive and/or unconventional; however, claimed subject matter is not limited to embodiments provided primarily for illustrative purposes. Thus, while advantages have been described in connection with illustrative embodiments, claimed subject matter is inventive and/or unconventional for additional reasons not expressly mentioned in connection with those embodiments. In addition, references throughout this specification to "claimed subject matter" refer to subject matter intended to be covered by one or more claims, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned, integrated circuit devices, such as processors, for example, may be found in a wide range of electronic device types. Computing devices, for example, may include integrated circuit devices, such as processors, to process signals and/or states representative of diverse content types for a variety of purposes. With an abundance of diverse content being accessible, signal and/or state processing techniques continue to evolve. Many electronic devices, such as any of a wide range of computing device types, may operate, at least in part, in accordance with some form of executable computer program code, such as software and/or firmware. Software compartmentalization may be increasing throughout the computing industry, leading to further development of virtualization technologies to improve security by partitioning a single operating system and its various services, for example.

Additionally, machine learning, for example, is becoming increasingly prevalent throughout the computing industry. Given the above-mentioned increase in software compartmentalization and/or virtualization, it appears that there may be an increasing need to securely schedule tasks for machine learning circuitry, including machine learning accelerators and/or the like, for example. More particularly, there may be an increasing need to securely schedule tasks having a variety of different quality of service (QoS) characteristics. Of course, machine learning accelerators are merely one example of a circuit type for which there may be an increasing need to have tasks securely scheduled and/or to achieve particular QoS characteristics for those tasks. Software developers, circuit designers, system designers and/or others may face challenges in providing such security while ensuring particular QoS characteristics in this evolving computing landscape.

FIG. 1 is a schematic block diagram depicting an embodiment 100 of an example computing device. In implementations, computing device 100 may be utilized, at least in part, to perform neural network processing, although subject matter is not limited in scope in this respect. In an implementation, computing device 100 may include various processors including, for example, a central processing unit (CPU) 110 and/or a neural network processor (NNP) 120. In an implementation, NNP 120 may include a number of neural network processing cores, such as neural network processing cores NNA 0, NNA 1, . . . , NNA m. Computing device 100 may also include an interconnect 130 and a memory controller 140, for example. In implementations, computing device 100 may also include one or more memory devices, such as memory 150, for example. Although a particular arrangement and/or configuration of computing device 100 is depicted and/or described, subject matter is not limited in scope to the particular examples discussed and/or depicted. Rather, for example, implementations may utilize any of a wide range of configurations and/or arrangements of processors, memories, interconnects, interfaces, etc.

In an implementation, CPU 110, NNP 120, interconnect 130 and/or memory controller 140 may comprise a "system-on-chip" (SOC), wherein CPU 110, NNP 120, interconnect 130 and/or memory controller 140 may be incorporated onto a particular semiconductor die and/or may be located within a particular semiconductor package. Of course, subject matter is not limited in scope in these respects.

Figure 2:
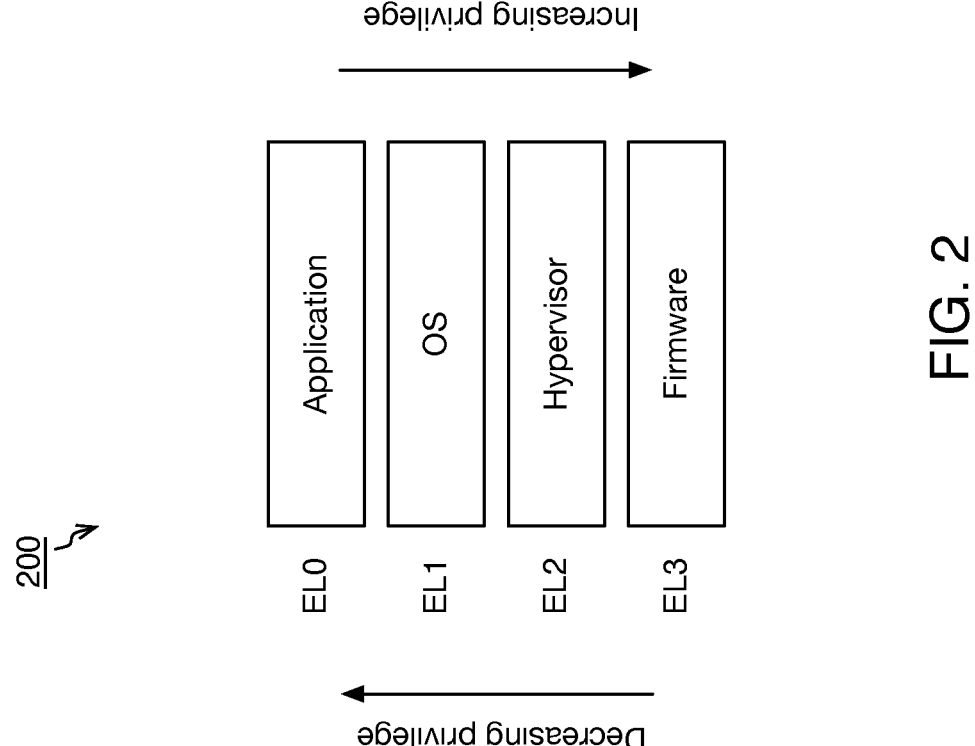
FIG. 2 is a diagram illustrating example exception levels for an example software model, in accordance with embodiments.

FIG. 2 is a diagram illustrating an example software model 200, including example exception levels. In implementations, software and/or firmware to be executed by a computing system, such as computing device 100, may be partitioned into different levels of access to various system and/or processor resources, including different hardware components. In this context, "hardware component" and/or the like refer to particular circuitry within a computing device. An example of how software and/or firmware may be partitioned into different levels of access to various system and/or processor resources may include a split between an OS kernel, which may have a relatively high level of access to system resources, and user applications, which may have a more limited ability to access system resources.

To achieve various levels of access to system resources, a software model, such as software model 200, for a computing device, such as computing device 100, may implement different levels of privilege. In implementations, a current level of privilege may be changed responsive at least in part to a processor taking or returning from an exception. Privilege levels may therefore sometimes be referred to as "exception levels." In implementations, exception levels may be labeled "EL0," "EL1," "EL2," and/or "EL3," for example, depending on the particular exception level being referred to. In an implementation, the higher the number associated with an exception level, the greater the privilege. Thus, for example, a particular software model, such as example model 200, may include application code running at EL0. Also, for example, an OS may operate at EL1. Further, in an implementation, a hypervisor may run at EL2. EL3 may indicate low-level firmware and/or security code, for example. As indicated by example software model 200 depicted in FIG. 2, low-level firmware and/or security code operating at EL3 may have greater and/or more direct access to hardware components due to an increased privilege as compared with a hypervisor operating at EL2 or an OS operating at EL1, for example. Of course, the particular labeling convention for example software model 200 described herein is merely an example, and subject matter is not limited in scope in these respects. Thus, "first level", "second level" and/or the like in reference to software components are merely meant to denote different levels of privilege in a given software model. For example, for some software models, "second level" may denote a greater level privilege than "first level," while for other software models the opposite may be true.

In virtualization-based security (VBS)-type systems, for example, a hypervisor may be utilized. "Hypervisor" and/or the like refers to a software component that, when executed by a processor of a computing device, may generate, run and/or manage one or more virtual machines on the computing device. In some systems, a particular purpose of a hypervisor may be to help ensure appropriate security separation of various aspects of an OS, for example. In some systems, more relatively complex functions such as scheduling various aspects of the OS and/or its services and/or scheduling software applications may remain a responsibility of the OS. That is, in such systems, the hypervisor may not be responsible for scheduling. Limiting the responsibilities of a hypervisor to security separation may allow the hypervisor to be sufficiently small and/or sufficiently simple in implementation to be formally verifiable (e.g., shown to be correct via human and/or machine analysis).

Figure 3:
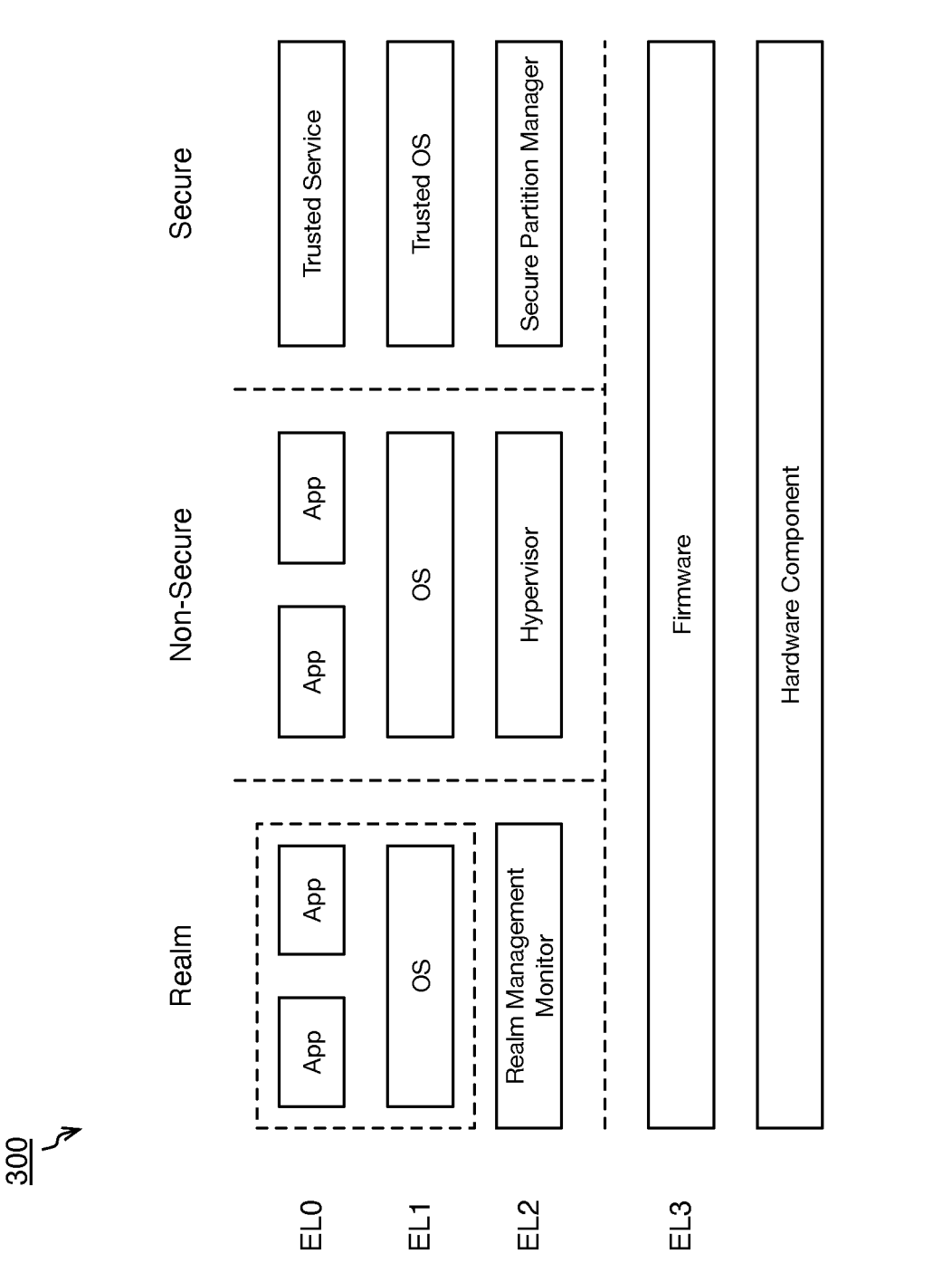
FIG. 3 is a diagram illustrating example exception levels for an example software model including secure and non-secure software components, in accordance with embodiments.

FIG. 3 is a diagram illustrating an example software model 300 including multiple security states, discussed more fully below. Example software model 300 also includes exception levels EL0-EL3, similar in at least some respects to the exception levels discussed above in connection with example software model 200.

Some processor architectures, including one or more processor architectures developed by ARM Limited, for example, may include a "TrustZone" and/or the like. In TrustZone, for example, a regular OS may operate in a non-secure security state (e.g. "non-secure world") while particular security services may operate as part of a trusted OS in a separate secure security state (e.g., "secure world"). See example software model 300 depicted in FIG. 3. Note that the non-secure security state representation depicted in FIG. 3 is similar in a number of respects to software model 200 depicted in FIG. 2, including, for example, EL0 applications, an EL1 OS and/or an EL2 hypervisor. Generally, "TrustZone" and/or the like refers to a hardware security extension directed at providing a secure execution environment by partitioning computer resources between a secure security state (e.g., secure world) and a non-secure security state (e.g., non-secure world). It may be noted that exception levels may be implemented in each of the various security states, including secure and non-secure security states and also including a realm security state, discussed more fully below. For example, in implementations, software components may operate at a $0^{th}$ exception level (e.g., EL0) in a non-secure security state (e.g., NS-EL0), a secure security state (e.g., S-EL0) and/or a realm security state (e.g., R-EL0). Similarly, software components may operate at a first level (e.g., EL1) in the non-secure security state (e.g., NS-EL1), the secure security state (e.g., S-EL1) and/or the realm security state (e.g., R-EL1), and software components may operate at a second level (e.g., EL2) in the non-secure security state (e.g., NS-EL2), the secure security state (e.g., S-EL2) and/or the realm security state (e.g., R-EL2). Of course, other implementations may utilize different exception levels, different security states and/or different labelling conventions, for example, and subject matter is not limited in scope in these respects.

Over time, the amount of software running under a trusted OS has increased significantly leading to relatively more complex software implementation. Generally, relatively more complex software may be more prone to bugs due at least in part to having a relatively larger codebase, for example. VBS may mitigate this tendency to at least some extent by moving some services back to a non-secure security state (e.g., non-secure world) while being isolated using a VBS hypervisor. However, VBS may not negate the need for TrustZone and/or the like, and/or may leave software running under a single trusted OS. Some processor architectures may utilize secure partitions, wherein an equivalent of a hypervisor referred to as a secure partition manager (SPM) may operate in a secure security state (e.g., secure world). See software model 300 depicted in FIG. 3, for example. In some systems, multiple trusted OSes may run under a SPM, thereby allowing different secure services to be more thoroughly compartmentalized, for example. In some systems, a SPM may be directed to the task of appropriate security separation while being small and/or simple enough in implementation to be formally verifiable, much like a VBS hypervisor, for example.

An additional security mechanism referred to as "realms" may be introduced to some processor architectures to provide additional support for confidential computing, for example. A realms architecture may introduce another security state referred to as a "realm" state, mentioned above, to operate alongside existing non-secure and secure states. See, for example, software model 300 depicted in FIG. 3. In implementations, a realm may thought of as being similar in at least some respects to an OS and/or secure partition, for example. Also, in implementations, a realm security state (e.g., realm world) may include a hypervisor-like "realm management monitor" (RMM) to manage one or more (e.g., multiple) realms. As with a VBS hypervisor and/or SPM, an RMM may be directed to providing appropriate security separation while being sufficiently simple and/or sufficiently small in implementation to be verifiable. In implementations, management components VBS, SPM and/or RMM may be different in at least some aspects from some perceptions of a hypervisor. For example, whereas a hypervisor may at times be seen as complex as an OS while also duplicating similar functionality in at least some aspects, the VBS, SPM and/or RMM management components may be significantly more simple and/or more small in their implementations.

As mentioned previously, machine learning (ML), for example, is becoming increasingly prevalent throughout the computing industry. It appears to be the expectation among some in the computing industry that a great deal (e.g., most or all) computation tasks may eventually take on some form of ML solution. To address this surge of interest in ML, more and more systems appear to be including hardware-based ML accelerators and/or the like. If ML tasks are to exist in many forms of computing and/or if computing is to become more and more compartmentalized as noted as above, then clearly there may be an increasing need to securely schedule tasks for ML accelerators and/or the like, for example. More particularly, there may be an increasing need to securely schedule tasks having a variety of different quality of service (QoS) characteristics. Of course, machine learning accelerators are merely one example of a circuit type for which there may be an increasing need to have tasks securely scheduled and/or to achieve particular QoS characteristics for those tasks. Note that the hardware component depicted in FIG. 3 may comprise an ML accelerator and/or the like, in an implementation. Of course, subject matter is not limited in scope in this respect.

In relatively simple computing systems (e.g., having a single OS) a software application may rarely have direct access to a particular hardware component such as an ML accelerator and/or the like. Instead, an application may utilize an application programming interface (API) to interact with a driver in the OS and the driver may utilize the component on the application's behalf. This approach allows the OS to prevent multiple applications from trying to do conflicting things with the particular component. In some circumstances, such a component may be capable of direct memory access and the OS may manage the particular hardware component more specifically to avoid corruption of memory either by accident and/or by malicious intent from a rogue application, for example.

In a relatively more complex system (e.g., having multiple OS, multiple virtual machines (VMs) and/or a more traditional hypervisor), another problematic aspect of hardware component management may be introduced. For example, task scheduling on an ML accelerator and/or the like that may support multiple logical hardware-based interfaces assignable to different software contexts may pose a relatively complex problem. For example, different tasks may have different specifications, such as with respect to quality of service (QoS). In implementations, tasks may vary in frequency (e.g., how often a task is repeated), size (e.g., runtime and/or computing resources required), urgency (e.g., a task to be executed without undue delay or as fast as possible vs. a task that may be less urgent), and/or may vary in other factors.

For example, task "A" might be a run frequently and/or may be specified to achieve relatively higher throughput. A second task "B" may run relatively very infrequent but may be specified to run at a much higher priority due to having a relatively small latency specification. In such a circumstance, if task A is running on a particular hardware component when task B is submitted, a particular task scheduler might choose to interrupt task A (e.g., saving state of task A) so it can start task B without having to wait for task A to complete. In such a circumstance, once task B completes the scheduler may choose to resume task A (e.g., restore state of task A).

For a relatively simple device that does not support virtualization and may only support two task priorities (e.g., high priority vs normal priority), this problem may be readily solved. For example, a device may support two job queues and/or the like for each of the two priorities and/or may choose to run tasks from the normal priority queue when there are no outstanding tasks in the high priority queue. For a more complex and/or more nuanced system, such as where there may exist multiple levels of priority (e.g., more than just two), it may be possible to extend the number of job queues to match the number of priority levels, for example. However, with increasing complexities and/or nuances with respect to priority for a system implementing job queues, it may be problematic to support a mechanism of latency bounding, for example.

Consider a virtualized device, for example, wherein multiple software contexts (e.g., virtual machines, secure partitions, realms, etc.) all want to submit tasks to a particular hardware component. In may be advantageous to implement a system of appropriate fairness among the difference contexts. However, challenges may be faced in this effort. For example, why would a particular software context not choose to rank all of its tasks as highest priority so that it can get favorable service compared to the other software contexts? Also, for example, challenges may be faced in applying an appropriate scaling of priorities from different software contexts. For example, can one software context's higher priority/lower latency tasks interrupt tasks from another software context? Also, for example, after completing an interrupting task, how should the task to be resumed be chosen? What happens if an intermediate priority task from a third context was submitted during the execution of the original high priority task? This are merely example challenges that may be faced in implementing such a system.

For some circumstances, such as may be the case in some central processing units (CPU), task scheduling may be handled by a relatively complex privileged software scheduler. While at a high-level all CPU workloads may be latency oriented, an OS's scheduler may balance different priorities across varied computing resources (e.g., different sized/capable CPU cores). The scheduler may achieve this by periodically interrupting running tasks to execute itself on the CPU cores and may then dispatch a chosen task for a given length of time before it interrupts again. However, this solution to some of the issues mentioned above may be somewhat inefficient.

In other circumstances, such as may be the case in an embedded CPU, particularly where running bare metal (i.e., without an OS) but also sometimes with a real-time OS (RTOS), task scheduling may be implemented primarily in response to external interrupts through the use of a nested vectored interrupt controller (NVIC), for example. In an NVIC, each interrupt line may have a given priority and among outstanding interrupts it is the outstanding interrupt with the highest priority that will be selected. For example, if a lower priority interrupt is being handled (e.g., task A), but then a higher priority interrupt is signaled (e.g., task B), then the CPU may switch quickly to task B. Also, when task B completes the CPU may automatically switch back to the next highest priority outstanding interrupt (e.g., task A). Such a system may present a relatively efficient and simple hardware solution for multiple priority levels but may not address cross-context (e.g., virtualized) priorities and/or may not address other aspects related to QoS such as bounded latency.

In other circumstances, a GPU largely may not support quality-of-service capabilities. Also, in at least some circumstances, GPUs for the most part may not be virtualized and/or different tasks may be largely serialized with respect to each other. In contrast to a CPU's latency-oriented tasks, a GPU's tasks may be largely throughput-oriented. It therefore may rarely be advantageous to interrupt tasks and/or may be more advantageous to keep tasks running to increase efficient throughput, for example. In circumstances wherein a GPU does support virtualization, it may be largely via the use of static reservations of hardware resources and so different software contexts mat not compete for the same resources, for example.

In still other circumstances, a virtualized ML accelerator may make use of a virtualized job queue. In such a system, software contexts may store task descriptors in memory representing a virtual device, and then a management software component (e.g., hypervisor) may interpret and/or wrap tasks requested from different contexts and schedule them with a particular hardware component as it sees fit. While such a solution may be suitable for some types of hardware components, it may create a relatively higher latency in job submission which may be negotiated through many levels of software abstraction which may not be advantageous for an ML accelerator receiving frequent and varied task submissions, for example. Additionally, such virtualization of a particular hardware component may require relatively highly complex software drivers to operate in relatively privileged software contexts which may be contrary to a desire to reduce and/or simplify such software components. Further, where an architecture supports multiple security states (e.g., non-secure, secure, realm, etc.), there may be additional complexities in supporting a management software component that can virtualize job queues across these states without compromising security and confidentiality, for example.

Embodiments disclosed herein, as representative, non-limiting examples, may be directed to addressing, in whole or in part, the example circumstances, issues, problems and/or challenges discussed above. For example, implementations may include scheduling tasks in particular hardware components for multiple software agents operating in multiple respective different security states (e.g., secure world, non-secure world and/or realm world) wherein the different security states may have conflicting aspects, and wherein the various tasks may have different levels of priority and/or may have different QoS characteristics. Also, embodiments disclosed herein may be advantageously utilized for management of a wide range of hardware component types. Implementations may include scheduling tasks to particular hardware components via hardware-based interfaces to be assigned to and/or utilized by OSes, VMs, secure partitions, realms, etc. without a need for multiple and/or complex device drivers for the various hypervisors, SPM and/or RMM, for example.

As discussed more fully below, implementations may include a "job slot" system and a job scheduler interface (JSI). In implementations, a job slot may comprise a mechanism through which tasks may be described and/or scheduled. In implementations, a JSI may comprise a software component, referred to as a JSI driver, and a hardware interface implemented on a particular hardware component, such as an ML accelerator, for example. As such, reference herein to "JSI" and/or the like may refer to a JSI driver and/or a JSI hardware interface. Various example communications between JSI driver and JSI hardware interface may be described in the examples discussed herein. Of course, subject matter is not limited in scope to the particular example embodiments and/or implementations discussed herein.

As also discussed below, implementations may provide one or more task control interfaces (TCI) for particular hardware components. In implementations, different TCIs may be assignable to different software components operating in any of various contexts (virtual machine, secure partition, realm, etc.) in any of various security states including, for example, non-secure, secure and/or realm security states. In implementations, a TCI may comprise a software component, referred to as a TCI driver, and a hardware interface implemented on a particular hardware component. As such, reference herein to "TCI" and/or the like may refer to a TCI driver and/or a TCI hardware interface. Various example communications between a TCI driver and one or more TCI hardware interfaces may be described in the examples discussed herein. Further, implementations may also include a primary management interface (PMI) for a particular hardware component (e.g., a single PMI per particular hardware component). In implementations, PMIs may manage one or more TCIs and/or may assign TCIs to particular software components, for example. In implementations, a PMI may comprise a software component, referred to as a PMI driver, and a hardware interface implemented on a particular hardware component. Therefore, reference herein to "PMI" and/or the like may refer to a PMI driver and/or a PMI hardware interface. Various example communications between a PMI driver and one or more PMI hardware interfaces may be described in the examples discussed herein.

Figure 4:
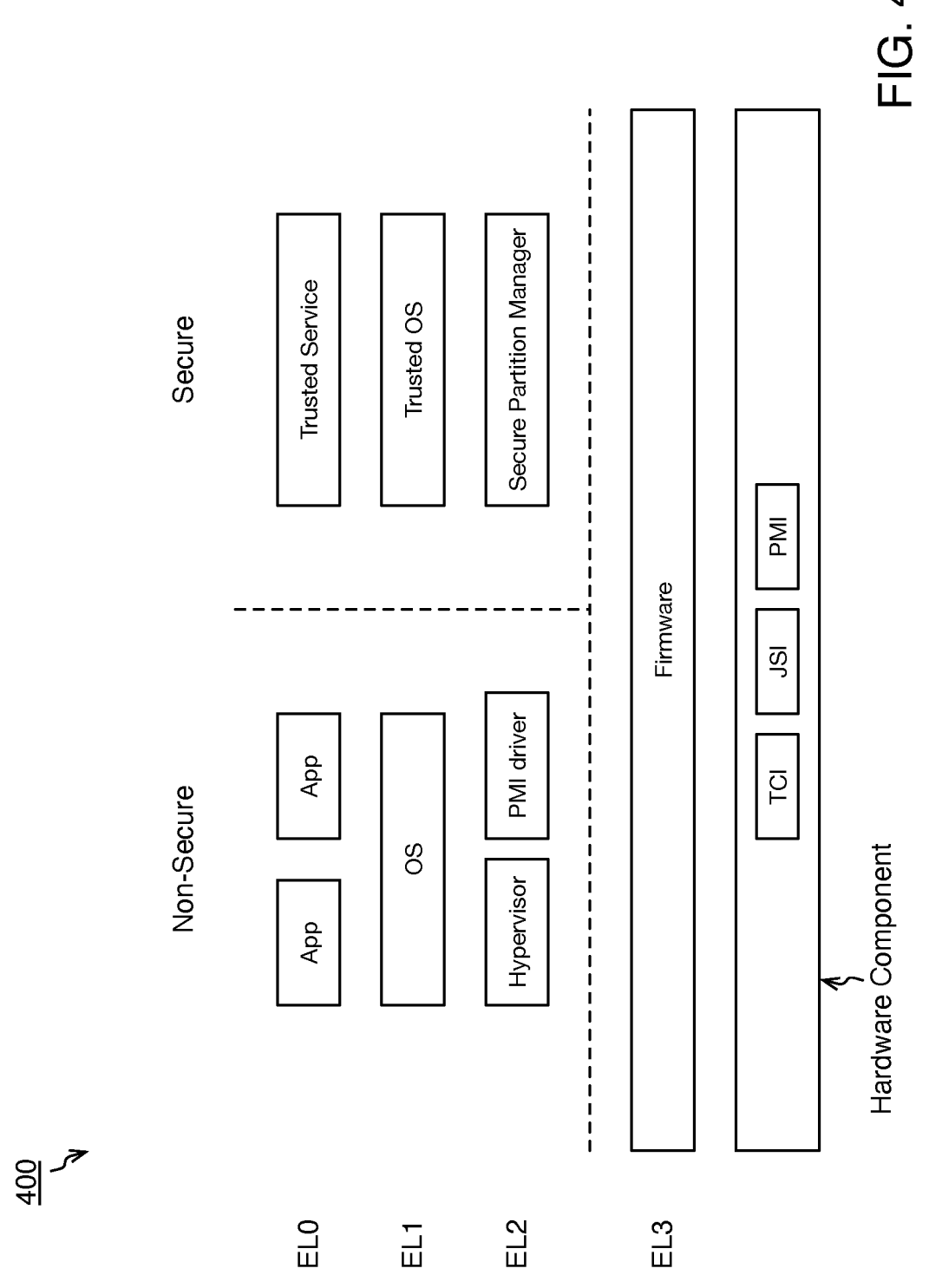
FIG. 4 is a diagram illustrating an example software model for an example computing device including a primary management interface, a job scheduler interface and/or one or more task control interfaces, in accordance with embodiments.

FIG. 4 is a diagram illustrating an example software model 400 for an example computing device, such as computing device 100. In implementations, computing device 100 may include a particular hardware component comprising a PMI, a JSI and/or one or more TCIs, as depicted in FIG. 4 below example software model 400. In an implementation, example software model 400 may include a number of characteristics similar at least in part to example models 200 and 300, discussed above. For example model 400, "realm" world aspects have not been depicted for clarity of explanation. It should be noted, however, that example embodiments may include multiple distinct security states including, by way of non-limiting examples, secure, non-secure and/or realm security states.

It may be noted that FIG. 4 depicts a hardware component comprising multiple hardware TCIs implemented in a particular hardware component. Also, in implementations, a TCI driver may operate at a first exception level in any of the various security states (e.g., NS-EL1, S-EL1, R-EL1, etc.), although subject matter is not limited in scope in this respect. In implementations, a hardware component may comprise an NNP, GPU, etc., although, again, subject matter is not limited in scope in this respect. Also, in implementations, the various TCIs may comprise interfaces by which one or more software agents may interact with the particular hardware component. In an implementation, a PMI driver may comprise a software component operating at a second exception level in a non-secure security state (e.g., NS-EL2), for example, although subject matter is not limited in scope in these respects.

As explained more fully below in connection with FIGS. 5-9, and also referring to FIG. 4, embodiments may include maintaining management of hardware component interfaces from a non-secure security state. For example, a PMI driver (e.g., operating in NS-EL2) may in connection with a hardware PMI interface of a particular hardware component, may set up interfaces (e.g., hardware-based TCIs) for software components operating in secure, non-secure and/or realm security states, in an implementation.

Generally, for example, a first level software component (e.g., TCI driver), whether operating in a secure, non-secure or realm security state, may request access to a particular hardware component. A second level (e.g., EL2) software component may receive the request from the first level software component and may provide an additional second level software component (e.g., PMI driver) operating in a non-secure security state (e.g., NS-EL2) specifications on how to configure a TCI interface for a particular hardware component. In implementations, the particular second level software component to receive the request from the first level software component may operate at the same security state as the first level software component. Thus, for example, if the requesting software component (e.g., TCI driver) operates at a first exception level in a realm security state (e.g. R-EL1) the responding particular second level software component may also operate in the realm security state (e.g., R-EL2). Similarly, for example, if the requesting software component operates at a first exception level in a secure security state (e.g. S-EL1) the particular second level software component may also operate in the secure security state (e.g., S-EL2) and if the requesting software component operates at a first exception level in a non-secure security state (e.g. NS-EL1) the particular second level software component may also operate in the non-secure security state (e.g., NS-EL2).

Responsive at least in part to the particular second level software component obtaining the request from the first level software component, the particular second level software component may communicate with a PMI driver. As mentioned, the PMI driver may operate in a non-secure security state. Thus, for circumstances in which the requesting first level software component (e.g., TCI driver) operates in a secure security state or a realm security state, for example, a cross-communication may occur between the particular second level software component operating in the secure or realm security state and the PMI driver operating in the non-secure security state. Of course, for circumstances in which the requesting first level software component operates in the non-secure security state, the particular second level software component operating in the non-secure state may communicate with the PMI driver without cross-communication between different security states.

Responsive at least in part to the request from the first level software component (e.g., via the particular second level software component), the PMI driver, at least in part via a PMI hardware interface for the particular hardware component, may access a particular TCI hardware interface for the particular hardware component, may allocate one or more job slots, may set up a memory management unit (MMU) mapping and/or may configure an interrupt controller for the particular hardware component, for example. Of course, these are merely examples of how a PMI may assign, configure and/or manage a particular hardware component via a TCI hardware interface for the particular hardware component (as mentioned, references herein to "PMI" and/or the like may refer to a PMI driver operating in conjunction with a PMI hardware interface). Once a PMI has configured a particular TCI hardware interface for a particular hardware component, the particular second level (e.g., S-EL2) software component (e.g., the second level software component to have received the request from the first level software component) may check to ensure that the PMI correctly configured the particular TCI hardware interface. Responsive to the configuration being validated, the particular TCI hardware interface may be marked as active (e.g., the TCI hardware interface may transition to an active state under control of a TCI driver) and the first level software component (e.g., TCI driver) may be allowed to access the TCI hardware interface. That is, the first level software component may schedule jobs directed to the particular hardware interface and may continue to do so as long as the TCI hardware interface remains in an active state, as explained more fully below. As also explained below, job slot management may be performed, at least in part, by a JSI.

Generally, embodiments may include a relatively more flexible scheduling model that may be managed, at least in part, by a JSI. As mentioned, reference herein to "JSI" and/or the like may refer to a JSI driver and/or a JSI hardware interface. For example, a JSI may comprise a JSI hardware interface operating under control of a JSI driver. In implementations, individual hardware components may comprise a single JSI hardware interface. A JSI driver may operate from an OS-type exception level (e.g., S-EL1, NS-EL1, R-EL1, etc.), although subject matter is not limited in scope in this respect. In implementations, a JSI hardware interface may comprise a plurality of hardware job slots implemented at a particular hardware component. Job slots may be dynamically allocated to one or more TCI hardware interfaces, for example. In implementations, individual job slots may store individual job descriptors.

In implementations, a JSI may be accessed by a scheduler for a system, such as computing device 100. For example, an OS may include a scheduler that may communicate with a JSI driver, and the JSI driver may communicate with a PMI for a particular hardware component. In implementations, a JSI may allocate, manage and/or prioritize job slots. In implementations, a JSI hardware interface for a particular hardware component may comprise at least twice as many job slots as the number of TCI hardware interfaces for the particular hardware component, although subject matter is not limited in scope in this respect.

In implementations, although a JSI may allocate, manage and/or prioritize job slots, the JSI may not have access to the job descriptors. Rather, for example, a JSI may have visibility of job slot status and/or may have an ability to reconfigure job slot properties and/or characteristics. In implementations, a JSI may not have an ability to view or modify a job descriptor contained within a job slot, for example.

Further, for example, a PMI may inform a JSI when it allocates or revokes a TCI hardware interface so that the JSI can maintain an understanding of which TCI drivers (e.g., first level software components S-EL1, NS-EL1, R-EL1, etc.) may be mapped to which TCI interfaces. In implementations, responsive at least in part to a TCI hardware interface being enabled by a PMI, the TCI hardware interface may start without any assigned job slots. In implementations, a TCI driver may request that one or more job slots be assigned to a particular TCI hardware interface by the JSI driver. Once jobs slots are assigned to a TCI hardware interface they may be populated and/or managed by the TCI driver and/or may be used repeatedly for new tasks, for example. In implementations, the TCI driver may continue to communicate with the JSI driver with regards to task priority, and, in effect, scheduling, which may be managed by the JSI, for example. In implementations, the contents of a job slot, the job descriptor, may be set by its associated TCI hardware interface and may not be visible through the JSI interface. In implementations, individual job slots may have various properties that may be configured by the JSI and that may be read-only visible via the TCI hardware interface. In implementations, a TCI hardware interface may store the job descriptor and read the job properties for job slots assigned to it, but may not modify the properties for the job slots, for example.

As mentioned, a JSI may manage job slots, may manage properties and/or characteristics of job slots and/or may assign particular job slots to particular TCI hardware interfaces. Also, as mentioned, a TCI driver may place job descriptors in job slots assigned by the JSI to the particular TCI hardware interface. In implementations, a JSI, implemented in hardware, for example, is never exposed to job descriptors, thereby ensuring a significant security aspect. Security may be maintained by preventing a JSI from being exposed to job descriptors and QoS aspects may be enhanced by having the JSI manage allocation of job slots and/or by having the JSI manage the characteristics of the various job slots. That is, for example, parameters specifying various properties of a job slot may be placed in a JSI hardware interface under control of a JSI driver and/or job descriptors may be placed in a TCI hardware interface under control of a TCI driver.

Figure 5:
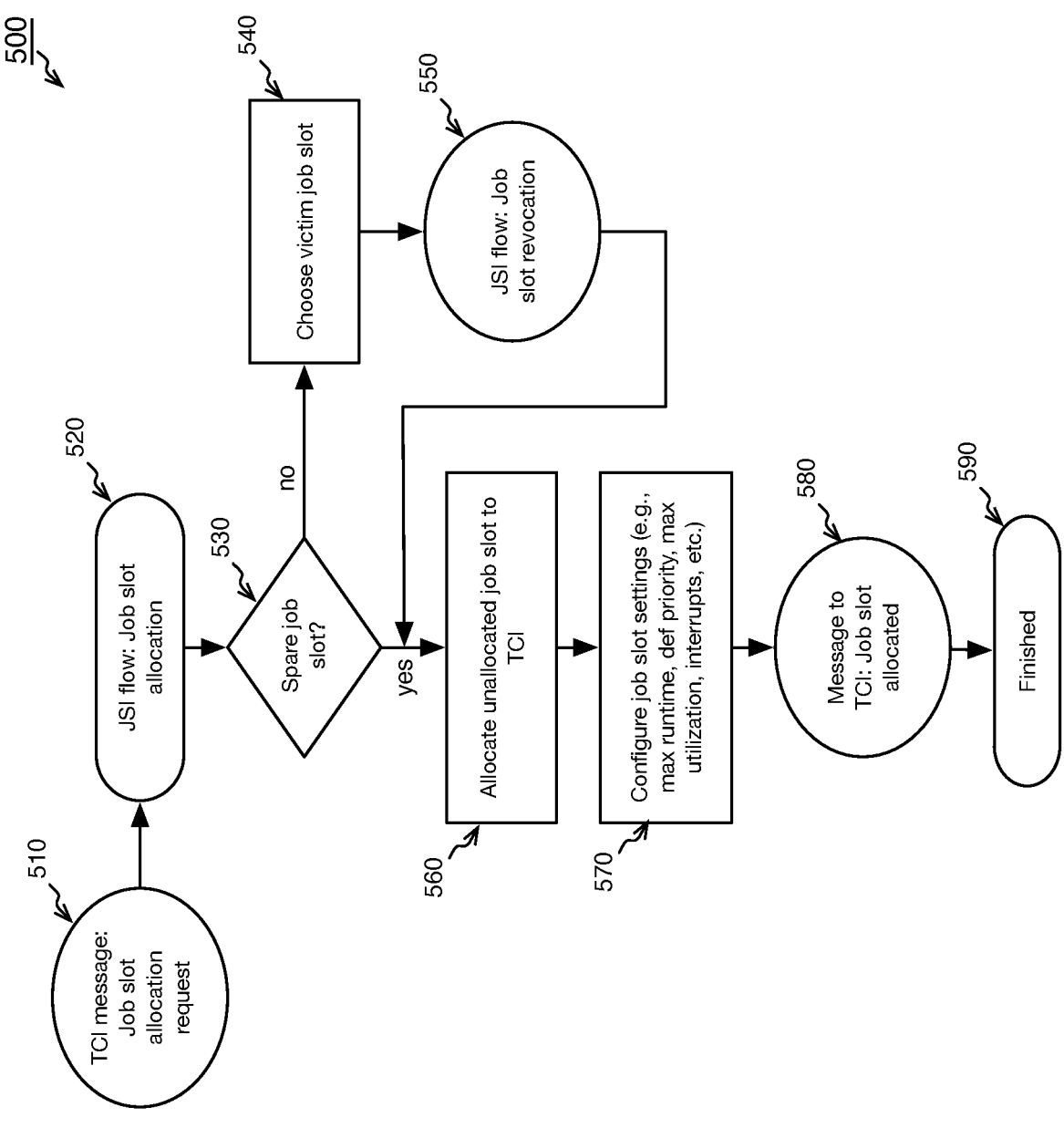
FIG. 5 depicts an example flow diagram for an example process for allocating job slots for a particular task control interface for a particular task control interface for a particular hardware component, in accordance with embodiments.

FIG. 5 depicts an example flow diagram for an example process 500 for allocating job slots for a particular TCI hardware interface for a particular hardware component, in accordance with embodiments. Embodiments in accordance with claimed subject matter may include all of blocks 510-590, fewer than blocks 510-590, and/or more than blocks 510-590. Likewise, it should be noted that content acquired or produced, such as, for example, input signals, output signals, operations, results, etc. associated with example process 500 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, blocks 510-590 may be implemented as one or more software, firmware and/or hardware services executed at computing device 100, for example.

Figure 7:
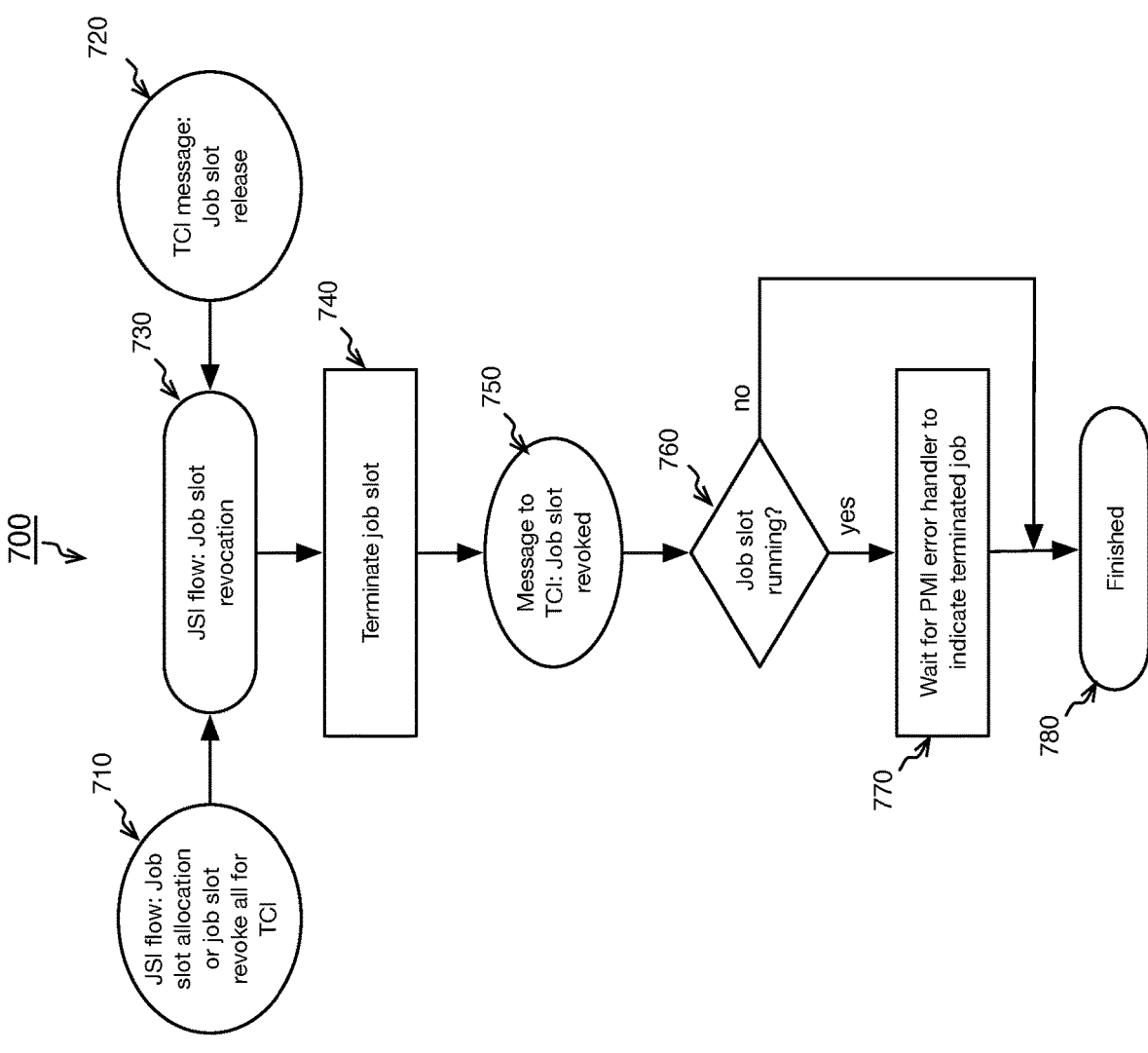
FIG. 7 depicts an example flow diagram for an example process for revoking job slots for a particular task control interface for a particular hardware component, in accordance with embodiments.

As indicated at block 510, a TCI driver may signal to a JSI driver a job slot allocation request message, for example. In implementations, as depicted at block 520, a JSI driver, operating in conjunction with a JSI hardware interface, may perform a job slot allocation operation, such as indicated at blocks 530-590. For example, at block 530, a determination may be made as to whether a spare job slot exists. That is, for example, a JSI hardware interface may comprise a plurality of job slots, and a number of the job slots may be allocated to one or more TCI hardware interfaces for a particular hardware component. If an un-allocated job slot is found to be available at block 530, the un-allocated job slot may be allocated to a particular TCI hardware interface, as indicated at block 560. Further, for circumstances in which it is determined that there exists no un-allocated job slots, a particular job slot may be selected to be a "victim" job slot, as indicated at block 540, meaning that a particular job slot may be de-allocated (e.g., revoked) from one TCI hardware interface so that it may be re-allocated to another TCI hardware interface. For example, as indicated at block 550, the JSI may perform a job slot revocation operation for a particular job slot at a particular TCI hardware interface so that the job slot may be allocated to a TCI hardware interface associated with the requesting TCI driver, as indicated at block 560. An example job slot revocation process 700 is depicted in FIG. 7, discussed below.

In implementations, as indicated at block 570, the JSI may configure job slot settings, such as, for example, maximum runtime, default priority level, maximum utilization, interrupts, etc., for the job slot allocated at block 560. Responsive at least in part to the configuration of the allocated job slot having been completed, the JSI driver may signal to the TCI driver that the job slot has been allocated, as indicated at block 580. Block 590 indicates a completion of the job slot allocation request. As discussed previously, one the JSI has allocated one or more particular job slots to a particular TCI hardware interface for a particular hardware component, the appropriate TCI driver may obtain one or more job descriptors and/or may store the one or more job descriptors in the one or more respective job slots. Again, it may be noted that the JSI may not have access to the job descriptors. Similarly, the TCI may not have the ability to modify job slot characteristics, settings, etc.

Figure 6:
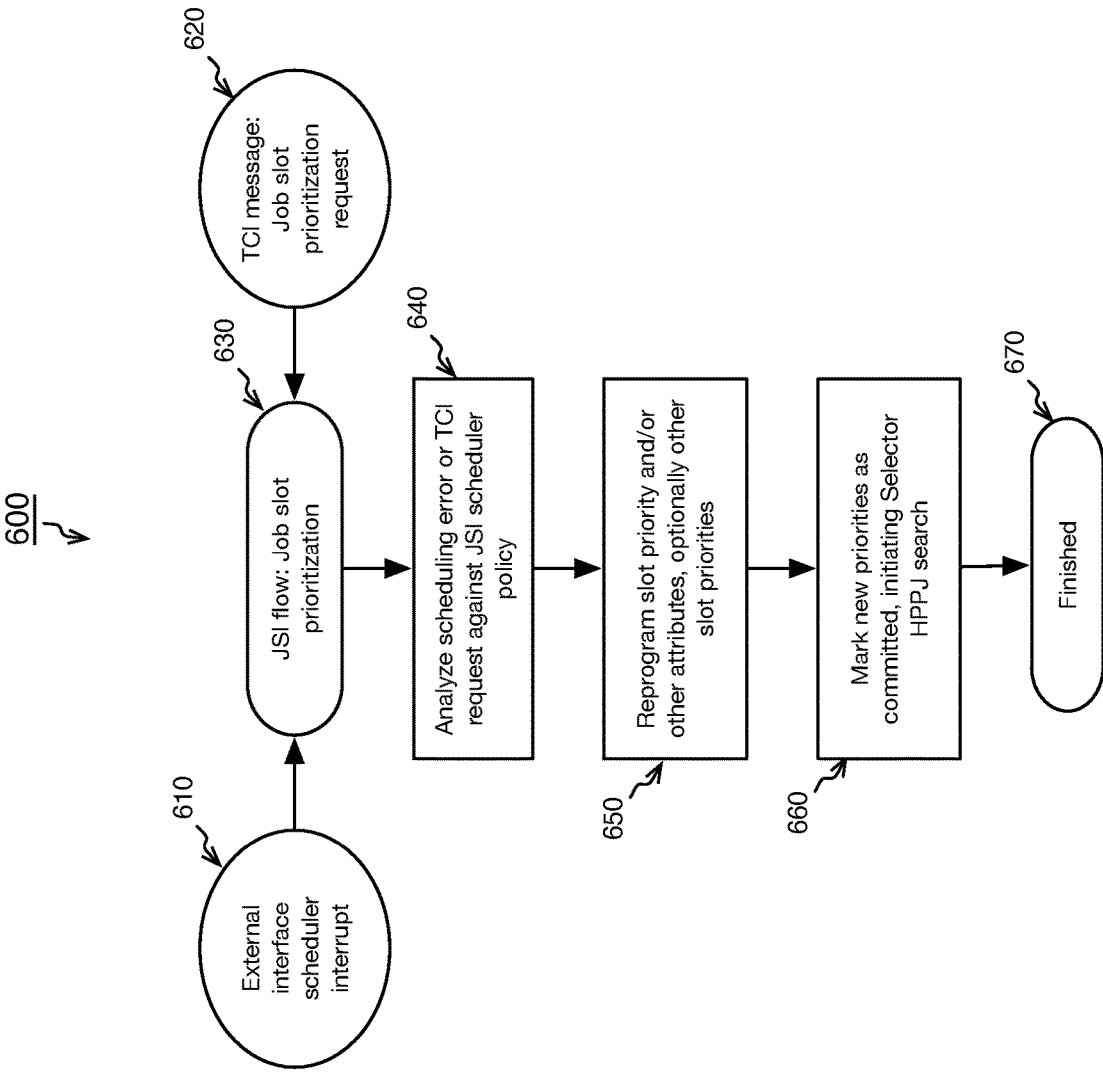
FIG. 6 depicts an example flow diagram for an example process for job slot prioritization for a particular task control interface for a particular hardware component, in accordance with embodiments.

FIG. 6 depicts an example flow diagram for an example process 600 for job slot prioritization for a particular TCI hardware interface for a particular hardware component, in accordance with embodiments. Embodiments in accordance with claimed subject matter may include all of blocks 610-670, fewer than blocks 610-670, and/or more than blocks 610-670. Likewise, it should be noted that content acquired or produced, such as, for example, input signals, output signals, operations, results, etc. associated with example process 600 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, blocks 610-670 may be implemented as one or more software, firmware and/or hardware services executed at computing device 100, for example.

As shown in FIG. 6, example process 600 may include a job slot prioritization operation to be performed by a JSI (e.g., JSI driver operating in conjunction with a JSI hardware interface) for a particular hardware component, as depicted at block 630. As depicted at blocks 610 and/or 620, a job slot prioritization operation may be initiated by a message from a TCI driver requesting a job slot prioritization, as shown at block 620, and/or by an external interface scheduler interrupt, as shown at block 610.

To prioritize a job slot, a JSI may perform example operations depicted at blocks 640-670. For example, as depicted at block 640, a scheduling error indicated by the external interface scheduler interrupt at block 610 and/or a TCI request obtained at block 620 may be analyzed against a particular JSI scheduler policy. As further depicted at block 650, priority characteristics and/or other attributes for a particular job slot may be reprogrammed, in an implementation. Additionally, for example, priority characteristics for one or more other job slots may be adjusted, perhaps in furtherance of the particular JSI scheduler policy and/or in accordance with the analysis performed at block 640.

In implementations, reprogrammed priority characteristics may be marked as committed, and a highest priority pending job (HPPJ) search may be initiated, as indicated at block 660. Block 670 indicates completion of the job slot prioritization operation.

FIG. 7 depicts an example flow diagram for an example process 700 for revoking job slots for a particular TCI for a particular hardware component, in accordance with embodiments. Embodiments in accordance with claimed subject matter may include all of blocks 710-780, fewer than blocks 710-780, and/or more than blocks 710-780. Likewise, it should be noted that content acquired or produced, such as, for example, input signals, output signals, operations, results, etc. associated with example process 700 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, blocks 710-780 may be implemented as one or more software, firmware and/or hardware services executed at computing device 100, for example.

In implementations, a JSI may perform a job slot revocation operation as indicated at block 730. For example, a job slot revocation operation may be performed by a JSI (e.g., JSI driver working in conjunction with a JSI hardware interface) at least in part in response to a job slot allocation and/or a revocation of job slots for all TCI hardware interfaces for a particular hardware component, as indicated at block 710, and/or at least in part in response to a TCI job slot release request, as indicated at block 720.

In implementations, a job slot revocation performed by a JSI may include operations indicated at blocks 740 through 780. For example, as indicated at block 740, a particular job slot may be terminated. As further indicated at block 750, a message may be provided to a TCI (e.g., TCI driver and/or TCI hardware interface) that a particular job slot has been revoked, for example. In implementations, a determination may be made as to whether the particular job slot is running. For circumstances in which the job slot is not running, the revocation process ends, as indicated at block 780. Also, for example, for circumstances in which the job slot is determined to be running, the JSI may wait for a PMI error handler to indicated a terminated job, as indicated at block 770.

Figure 8:
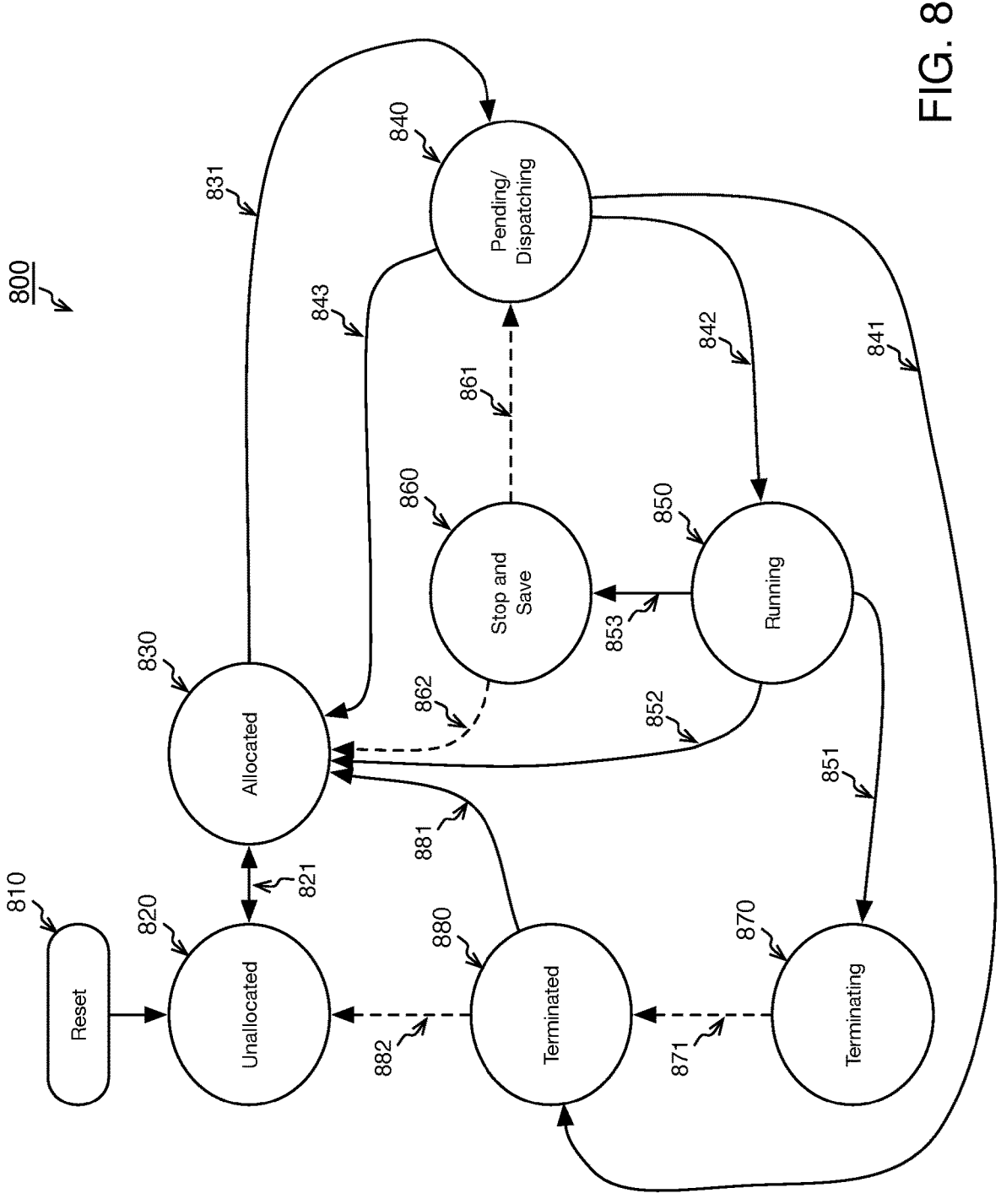
FIG. 8 is an illustration depicting an example state diagram for a particular hardware component, in accordance with embodiments.

FIG. 8 is an illustration depicting an example state diagram 800 for a particular hardware component, in accordance with embodiments. Embodiments in accordance with claimed subject matter may include all of blocks 810-880, fewer than blocks 810-880, and/or more than blocks 810-880. Likewise, it should be noted that content acquired or produced, such as, for example, input signals, output signals, operations, results, etc. associated with example state diagram 800 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, blocks 810-880 may be implemented as one or more software, firmware and/or hardware services executed at computing device 100, for example.

Example state diagram 800 represents a lifecycle of a particular job slot. In implementations, a JSI hardware interface may comprise a plurality of job slots implemented in hardware. For a particular job slot of the plurality of job slots, subsequent to a reset state 810, the job slot may be in an unallocated state 820. An allocated state 830 is also depicted. A job slot may transition between unallocated state 820 and allocated state 830, or between allocated state 830 and unallocated state 820, responsive at least in part by a job slot assignment and/or a job slot revocation, indicated by arrow 821, performed by a JSI driver for a particular hardware component.

In an implementation, once a particular job slot is in allocated state 830, a TCI driver may via interaction with a TCI hardware interface of a particular hardware component, store a job descriptor in the particular job slot, as indicated by arrow 831, thereby transitioning the particular job slot to a pending and/or dispatching state 840. Further, in implementations, responsive at least in part to the particular job slot being placed in the pending/dispatching state 840 by the TCI driver, the JSI driver may dispatch a particular job specified by the stored job descriptor to particular backend circuitry of the particular hardware component, as indicated by arrow 842, thereby placing the particular job slot in a running state 850.

In implementations, from running state 850, responsive at least in part to a job error signal or a job slot revocation request by the JSI driver and/or responsive at least in part to a job abort request from the TCI driver, as indicated by arrow 851, the particular job slot may transition to a terminating state 870. Further, in implementations, from running state 850, the particular job slot may transition back to allocated state 830 responsive to completion of the particular job specified by the stored job descriptor, as indicated by arrow 852.

In implementations, while in running state 850, a job slot may be checked such that it does not exceed a specified run-time (e.g., a maximum runtime). A maximum runtime may be defined as the minimum of a JSI-defined job slot maximum and an optional PMI-defined TCI maximum. For example, if the specified runtime (e.g., maximum runtime) is exceeded, the job errors and may be terminated, as indicated by arrow 851.

In an implementation, the JSI driver may also define a per job slot occupancy (e.g., maximum occupancy). For example, the maximum occupancy may comprise a minimum of the JSI-defined per job slot maximum and an optional PMI-defined per TCI maximum. If the job descriptor's indication of device backend quantity exceeds the configured maximum, then the job will error and not start, as again depicted by arrow 851, for example. In implementations, the TCI driver may view run-time and/or occupancy specifications (e.g., maximums) for the particular job slot and/or may negotiate with the JSI before job submission for an appropriate configuration. In an implementation, the PMI-defined per TCI maximums cannot be changed without revoking and reconfiguring the TCI, for example. In an implementations, if a job errors due to exceeding its allowed run-time and/or for another error reason, outstanding jobs (e.g., all outstanding jobs) from the same TCI hardware interface may be ignored and/or may be prevented from starting until the TCI driver reprograms its relevant job slots, allowing chained jobs to be queued safely, for example. Job errors may be signaled via a PMI interrupt.

Also, in implementations, a job stop request initiated by the TCI driver and/or a job interruption signal by the JSI driver, indicated by arrow 853, may result in the particular job slot transitioning from running state 850 to a stop and save state 860. From the stop and save state, the JSI driver may transition the particular job slot back to the pending/dispatching state 840 as a result of the job being saved from interruption, as indicated by arrow 861, for example. As further indicated by arrow 862, the particular job slot may transition from stop and save state 860 to allocated state 830 as a result of the job being saved from a stop request, for example.

Returning to the pending/dispatching state 840, the particular job slot may be placed in the terminated state 880 as a result of the JSI driver performing a job slot revocation request and/or as a result of a job error for a job on another job slot for the same particular TCI, as indicated by arrow 841, in implementations. Also, in implementations, the particular job slot may transition from terminating state 870 to terminated state 880 as a result of the JSI halting outstanding operations, as indicated at block 870, for example.

In implementations, the particular job slot may transition from terminated state 880 to allocated state 830 as a result of a clearing of the job slot performed at least in part by the TCI driver, as indicated by arrow 861. A TCI driver clearing of the job slot may also result in a transition of the particular job slot from the pending/dispatching state 840 to allocated state 830, as indicated by arrow 843, for example. Additionally, for example, the JSI driver may transition the particular job slot from terminated state 880 to unallocated state 820 due at least in part to a job slot revocation indicated by arrow 882.

In example embodiments, when a particular hardware component can service a new task, it may utilize a priority value set for each job slot by the JSI to arbitrate between pending jobs. Two or more different job slots may share the same priority value, in which case a round-robin arbitration may be performed to select between those job slots, for example. In implementations, a JSI may store two different priorities for each job slot, such as a default priority and an actual priority. Of course, other implementations may include more than two different priorities. Responsive at least in part to a job slot transitioning from allocated state 830 to pending state 840, the actual priority may be automatically updated to match the default priority, for example. In implementations, the JSI may modify either priority at any time, but the actual priority may be the one used for scheduling decisions.

In implementations, a JSI hardware interface may include a selector unit responsible for determining the highest priority pending job (HPPJ), and may also include a dispatcher unit responsible for dispatching the HPPJ, for example. When the TCI stores a job descriptor in a job slot, transfer-ring it to pending state 840, the selector unit may compare the job slot's priority to the current HPPJ. If the job slot is higher priority than the HPPJ, or there is no outstanding HPPJ, then the selector unit may mark this job slot as the new HPPJ and may inform the dispatcher unit.

Further, in implementations, the JSI driver may periodically and/or due to prompting make changes to job slots' priorities. In implementations, the selector unit may not react to these changes. Once the JSI driver has completed its priority updates, the JSI may trigger a selector walk at least in part by marking the new priorities as committed, for example. In implementations, the selector unit may then iteratively walk through all the jobs slots in the pending state and/or may calculate an intermediate (IHPPJ). For circumstances in which a job slot transitions to pending during the selector walk, the job slot's priority may be compared to the IHPPJ rather than the HPPJ, for example. In implementations, once the selector unit's walk is complete, the IHPPJ may be committed and may become the new HPPJ. The selector unit may inform the dispatch unit, for example.

In implementations, a JSI may specify a maximum pending-time for each job slot. If a job slot exceeds the specified duration in pending state 840, an interrupt may be signaled to the JSI. This timeout may be reset while in allocated state 820. In implementations, the timeout may be paused but not reset while in other non-pending states. On receipt of this pending timeout interrupt, the JSI driver may decide to alter the job slot priorities and/or to commit these new priorities to trigger the selector unit to initiate a new walk. In implementations, responsive at least in part to the selector unit being in the process of a walk while priorities are being changed, the new priorities may or may not be examined during this walk, even without being committed. In circumstances in which new priorities are marked as committed during a walk, the selector unit may continue its existing walk and/or may make note that on completion of the walk, subsequent to informing the dispatcher unit, it should start a new walk.

In implementations, the dispatcher unit may be informed of new HPPJs from the selector unit. Also, in implementations, being selected as the HPPJ may not immediately trigger action. For example, in circumstance in which the dispatcher decides that it is appropriate to dispatch the HPPJ, it may transition the job slot to the dispatching state. The pending and dispatching job slot states 840 may be largely identical, with the difference in state only visible to the selector and dispatcher, for example. Thus, the two states are depicted in FIG. 8 as sharing a pending/dispatching state 840. In implementations, a transition from a pending state to a dispatching state may be unidirectional. For example, once the dispatcher unit decides to initiate dispatch of the HPPJ to the hardware component backend it may not stop to consider a change in HPPJ, although this may be thwarted by events that may cause a transition out of the pending state, such as a clear and/or revocation of the job slot. After dispatching the HPPJ, the dispatcher unit may signal to the selector unit to initiate a new walk to find the next HPPJ, and may incorporate any jobs that might have been interrupted in the process of dispatching the previous HPPJ.

The decisions leading to the dispatcher unit to initiate dispatch, and/or the mechanisms it may use to affect this, may be varied depending at least in part on a specification of QoS characteristics. In implementations, to inform its decisions, the dispatcher unit may keep a record of all of the currently running jobs, their priorities, and, in some implementations, which TCI hardware interface they originate from and/or that TCI hardware interface's associated backend quantity specification (e.g., maximum).

Below, implementations may be described in connection with particular QoS circumstances and/or characteristics. For example, for a particular QoS specification, the dispatcher unit may select the HPPJ for dispatch when there are no jobs running on the hardware component backend.

In other implementations, for another particular QoS specification, support may be added for priority-based interrupts. For example, a job slot may be configured by the JSI (e.g., JSI driver working via a JSI hardware interface) to optionally interrupt other running tasks if it is higher priority than currently running tasks (e.g., stop-save-and-switch-restore). Also, for example, a job slot may also be configured by the JSI to be uninterruptable, even in circumstances wherein it is a lower priority than higher priority tasks that may later arise. An uninterruptable task may still be subject to the maximum run-time error condition, in implementations. In an implementation, the state of an interrupted job may be automatically saved in an implementation specific manner and/or may be later automatically restored and/or resumed responsive at least in part to it again becoming the HPPJ. The interruption may be transparent/invisible to the interrupted job, other than a longer latency to completion, for example. Time spent interrupted and/or during a save and restore processes may not count towards a task's maximum run-time check.

Further, for the current example QoS specification, the dispatcher unit may also select the HPPJ for dispatch responsive at least in part to it exceeding the priority of the currently running job should the interrupt settings described above allow it to interrupt. In this example scenario, the dispatcher unit may be responsible for coordinating the associated interrupt, stop and save of the current running job, for example.

Due at least in part to the nature of the separation between the selector and dispatcher units, some scenarios may arise that may not be immediately apparent. For example, if there are two pending jobs both higher priority than the current running job, but themselves with the same priority, the two pending jobs may be arbitrated in a round-robin fashion, for example, and so it may be possible that the HPPJ job slot may be configured as not being able to interrupt tasks, while the other pending job is configured with the ability to interrupt. In this circumstance, the running job may not be interrupted and both pending jobs may continue to wait. In an implementation, such behavior may comprise a valid configuration. The pending job with interrupt privileges may however, have a lower pending timeout than the HPPJ, and so exceeding this timeout may prompt the JSI to reconfigure it with a higher priority than the current HPPJ, making it the new HPPJ and allowing it to interrupt the current running job. In implementations, it may be up to the JSI driver to choose appropriate priorities and/or to enable interruption to achieve the desired results.

In other implementations, for another particular QoS specification, support may be added for dynamic job slot concurrency in which multiple jobs may run in parallel on a particular hardware component backend. In an implementations, a hardware component may support a discoverable number of device partitions. For example, a relatively smaller number of partitions may be supported (e.g., 2-4), although subject matter is not limited in scope in this respect. In an implementation, it may not be guaranteed that the hardware component backend is kept fully occupied and/or tasks may be provided on a best-effort basis that may be implementation specific. For example, a hardware component backend that may be capable of being apportioned into quarters may only support running a half occupancy job as if the device was apportioned in halves. For such an example, the hardware component may run the half occupancy job on quarters 0 and 1, or quarters 2 and 3, but not arbitrary mixes of quarters. Similarly, if a single quarter is free and there are two jobs pending, one half occupancy and the other quarter occupancy, if the half occupancy job is higher priority than the quarter priority job then the hardware component may choose to not start either job. To support queuing chained jobs, the TCI (e.g., TCI driver working via a TCI hardware interface) may mark a job slot as not supporting concurrent execution with other jobs from the same TCI, for example. In implementations, this property may be utilized in conjunction with priority scheduling and/or an interrupt enable system and thus may be added to the preceding or following jobs to achieve the same or similar effect. In an implementation, the TCI driver may specify the quantity of hardware component backend required by a job slot in the job descriptor, for example.

For the current example QoS specification, the dispatcher unit may consider the HPPJ for dispatch in comparison to all running jobs on the hardware component backend. In implementations, the dispatcher unit may only act if there is already enough of a hardware component's backend idle and/or it may make enough of a hardware component's backend available. For example, if it can interrupt some jobs per particular specified QoS characteristics, but not sufficient to make room for the HPPJ, then it may not interrupt those jobs and may not act. The dispatcher unit may additionally incorporate device specific rules about how portions of the hardware component backend can be grouped together, as described above. In implementations, the dispatcher unit may also consider that the PMI may specify a per TCI maximum utilization of the backend. For example, if dispatching the HPPJ were to cause this maximum to be exceeded, the dispatcher unit may not act. In circumstances in which the dispatcher unit may act and/or may have a choice of multiple running jobs to interrupt, it may select the lowest priority job to interrupt, for example. In an implementation, the dispatcher unit may implement a round-robin arbitration as a final decision-maker when there are multiple running jobs to interrupt with the same priority, for example.

FIG. 9 is a flow diagram illustrating an example process for scheduling tasks for a particular hardware component, in accordance with embodiments. Embodiments in accordance with claimed subject matter may include all of blocks 910-940, fewer than blocks 910-940, and/or more than blocks 910-940. Likewise, it should be noted that content acquired or produced, such as, for example, input signals, output signals, operations, results, etc. associated with example process 900 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, blocks 910-940 may be implemented in software, firmware and/or hardware at computing device 100, for example.

As depicted in FIG. 9, example process 900 may pertain to a particular hardware component of a computing device, such as computing device 100. In implementations, the particular hardware component may comprise a NNP and/or a GPU, for example, although subject matter is not limited in scope in these respects. As depicted at block 910, process 900 may include allocating, at least in part via execution of a particular job scheduler software component, one or more job slots comprising particular job slot circuitry of a particular hardware component to at least one particular hardware based task control interface (TCI) of one or more hardware based TCIs for the particular hardware component. Further, as depicted at block 920, example process 900 may also include obtaining, at least in part via execution of a software component (e.g., TCI driver) for the at least one particular hardware based TCI, one or more particular job descriptors. The job descriptors may be stored, at least in part via execution of the software component for the at least one particular hardware based TCI, in the respective one or more job slots, as depicted at block 930, for example, and the particular hardware component may perform a particular task specified, at least in part, by at least one of the one or more particular job descriptors, as indicated at block 940.

In implementations, allocating the one or more job slots to the at least one particular hardware based TCI, at least in part via execution of the particular job scheduler software component, may further include assigning one or more respective priority values to the one or more job slots. In implementations, the particular hardware component performing the particular task specified, at least in part, by the one or more particular job descriptors may include the particular hardware component selecting the particular task based at least in part on the one or more respective priority values assigned to the one or more job slots. Also, in an implementations, the one or more job descriptors may comprise two or more job descriptors, wherein the one or more respective priority values may comprise two or more similar priority values, and wherein the selecting the particular task based at least in part on the two or more similar priority values may comprise the particular hardware component performing a round-robin type arbitration operation between the two or more job descriptors.

In implementations, the one or more hardware based TCIs may comprise a plurality of hardware based TCIs, and associating the at least one particular hardware based TCI to the particular job scheduler software component may include associating the plurality of hardware based TCIs to the particular job scheduler software component. Further, in implementations, the software component (e.g., TCI driver) for the at least one particular hardware based TCI comprises a non-secure first level software component, for example. In implementations, the particular job scheduler software component may also comprise a non-secure first level software component.

Additionally, in implementations, obtaining the one or more particular job descriptors may include obtaining the one or more particular job descriptors from a random access memory. In implementations, the software component for the at least one particular hardware based TCI may operate in a non-secure security state, a secure security state or a realm security state. In implementations, allocating the one or more job slots to the at least one particular hardware based TCI comprises allocating the one or more job slots responsive at least in part to a request from a TCI driver (e.g., first level software component for the particular hardware based TCI). Also, example process 900 may further include revoking the one or more job slots responsive at least in part to a job slot release request from the TCI driver.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

The terms "correspond", "reference", "associate", and/or similar terms relate to signals, signal samples and/or states, e.g., components of a signal measurement vector, which may be stored in memory and/or employed with operations to generate results, depending, at least in part, on the above-mentioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more another memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space.

Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 10:
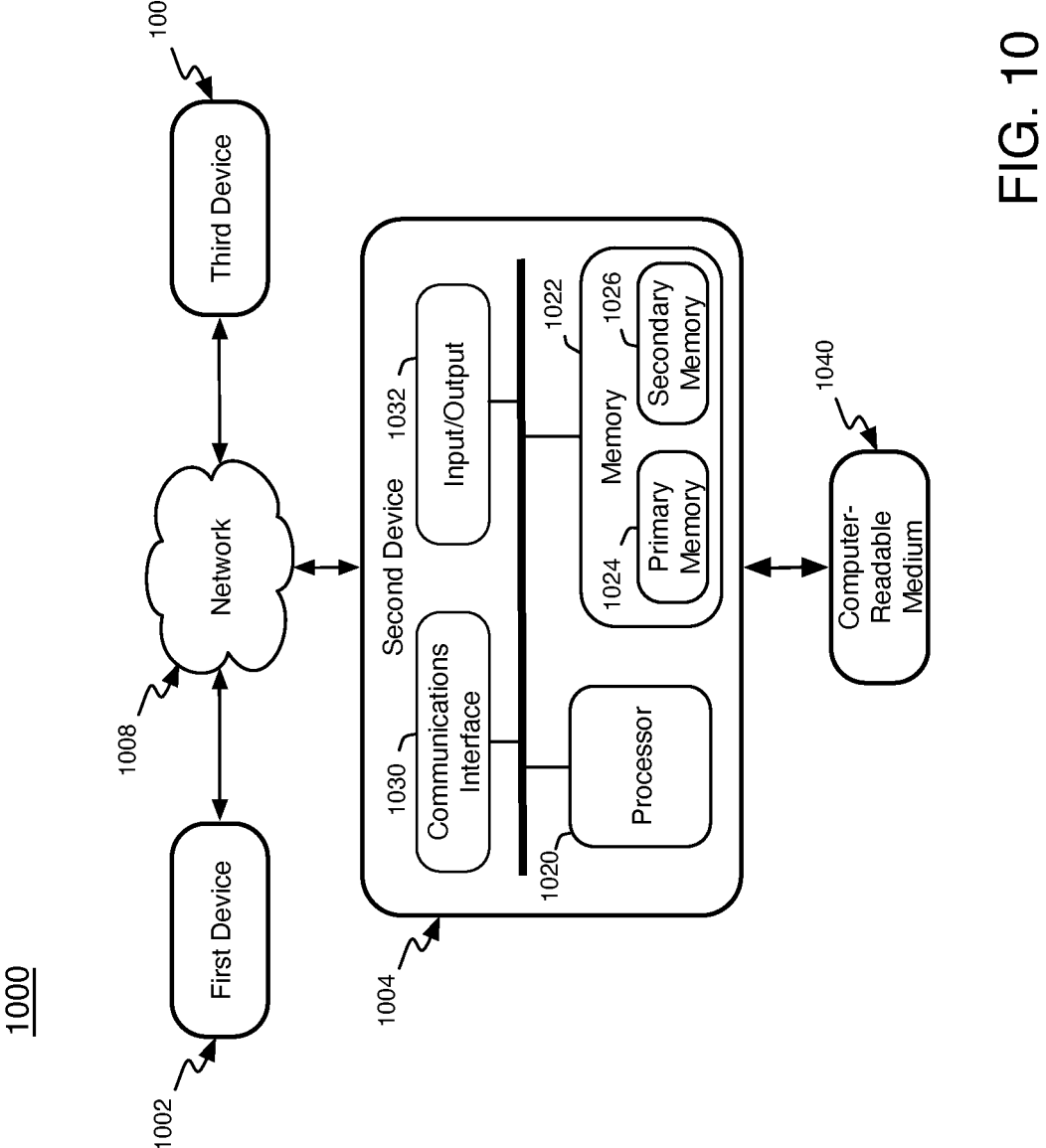
FIG. 10 is a schematic diagram illustrating an implementation of an example computing environment associated with processes to facilitate task scheduling for a particular hardware component, according to an embodiment.

FIG. 10 is a schematic diagram illustrating an implementation of an example computing environment associated with processes to facilitate assigning, configuring and/or managing a particular hardware device, according to an embodiment. In the example depicted in FIG. 10, a system embodiment may comprise a local network (e.g., device 1004 and medium 1040) and/or another type of network, such as a computing and/or communications network. For purposes of illustration, therefore, FIG. 10 shows an embodiment 1000 of a system that may be employed to implement either type or both types of networks. Network 1008 may comprise one or more network connections, links, processes, services, applications, and/or resources to facilitate and/or support communications, such as an exchange of communication signals, for example, between a computing device, such as 1002, and another computing device, such as 1006, which may for example, comprise one or more client computing devices and/or one or more server computing device. By way of example, but not limitation, network 1008 may 1008 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 10 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or similar terms, then, it is intended, pursuant to that statutory section, that corresponding structure, material and/or acts for performing one or more functions be understood and be interpreted to be described at least in FIGS. 1-9 and in the text associated with the foregoing figure(s) of the present patent application.

Referring now to FIG. 10, in an embodiment, first and third devices 1002 and 1006 may 1006 may be capable of rendering a graphical user interface (GUI) for a network device and/or a computing device, for example, so that a user-operator may engage in system use. Device 1004 may potentially serve a similar function in this illustration. Likewise, in FIG. 10, computing device 1002 ('first device' in figure) may interface with computing device 1004 ('second device' in figure), which may for example, also comprise features of a client computing device and/or a server computing device, in an embodiment. Processor (e.g., processing device) 1020 and memory 1022, which may comprise primary memory 1024 and secondary memory 1026, may communicate by way of a communication bus 1015, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1004, as depicted in FIG. 10, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 10, computing device 1002 may provide one or more sources of executable computer instructions in the form physical states and/or signals (e.g., stored in memory states), for example. Computing device 1002 may communicate with computing device 1004 by way of a network connection, such as via network 1008, for example. As previously mentioned, a connection, while physical, may not necessarily be tangible. Although computing device 1004 of FIG. 10 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1022 may comprise any non-transitory storage mechanism. Memory 1022 may 1022 may comprise, for example, primary memory 1024 and secondary memory 1026, additional memory circuits, mechanisms, or combinations thereof may be used. Memory 1022 may 1022 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1022 may be utilized to store a program of executable computer instructions. For example, processor 1020 may fetch executable instructions from memory and proceed to execute the fetched instructions. Memory 1022 may also comprise a memory controller for accessing device readable-medium 1040 that may carry and/or make accessible digital content, which may include code, and/or instructions, for example, executable by processor 1020 and/or some other device, such as a controller, as one example, capable of executing computer instructions, for example. Under direction of processor 1020, a non-transitory memory, such as memory cells storing physical states (e.g., memory states), comprising, for example, a program of executable computer instructions, may be executed by processor 1020 and able to generate signals to be communicated via a network, for example, as previously described. Generated signals may also be stored in memory, also previously suggested.

Memory 1022 may store electronic files and/or electronic documents, such as relating to one or more users, and may also comprise a computer-readable medium that may carry and/or make accessible content, including code and/or instructions, for example, executable by processor 1020 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 10, processor 1020 may comprise one or more circuits, such as digital circuits, to perform at least a portion of a computing procedure and/or process. By way of example, but not limitation, processor 1020 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1020 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 10 also illustrates device 1004 as including a component 1032 operable with input/output devices, for example, so that signals and/or states may be appropriately communicated between devices, such as device 1004 and an input device and/or device 1004 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:

allocating, at least in part via execution of a particular job scheduler software component, one or more job slots comprising particular job slot circuitry of a particular hardware component to at least one particular hardware based task control interface (TCI) of one or more hardware based TCIs for the particular hardware component;

obtaining, at least in part via execution of a software component for the at least one particular hardware based TCI, one or more particular job descriptors, the software component for the at least one particular hardware based TCI comprising a TCI driver;

storing, at least in part via execution of the software component for the at least one particular TCI, the obtained one or more particular job descriptors in the respective one or more job slots, wherein the particular job scheduler software component is prevented from viewing or modifying the one or more particular job descriptors, the particular hardware component performing a particular task specified, at least in part, by at least one of the one or more particular job descriptors; and revoking the one or more job slots responsive at least in part to a job slot release request from the TCI driver.

2. The method of claim 1, wherein the allocating the one or more job slots to the at least one particular hardware based TCI, at least in part via execution of the particular job scheduler software component, further comprises assigning one or more respective priority values to the one or more job slots.

3. The method of claim 2, wherein the particular hardware component performing the particular task specified, at least in part, by the one or more particular job descriptors comprises the particular hardware component selecting the particular task based at least in part on the one or more respective priority values assigned to the one or more job slots.

4. The method of claim 3, wherein the one or more particular job descriptors comprise two or more job descriptors, wherein the one or more respective priority values comprise two or more similar priority values, and wherein the selecting the particular task based at least in part on the two or more similar priority values comprises the particular hardware component performing a round-robin type arbitration operation between the two or more job descriptors.

5. The method of claim 1, wherein the one or more hardware based TCIs comprise a plurality of hardware based TCIs, and further comprising associating the plurality of hardware based TCIs with the particular job scheduler software component.

6. The method of claim 1, wherein the software component for the at least one particular TCI comprises a TCI driver operating in a non-secure security state at a first exception level.

7. The method of claim 1, wherein the particular job scheduler software component to comprises a non-secured first level software component.

8. The method of claim 1, wherein the obtaining the one or more particular job descriptors comprises the software component for the at least on particular TCI obtaining the one or more particular job descriptors from a random access memory.

9. The method of claim 8, wherein the software component for the at least on particular TCI operates in a non-secure security state, a secure security state or a realm security state.

10. The method of claim 1, wherein the software component for the particular hardware based TCI comprises a first level TCI driver and wherein the allocating the one or more job slots to the at least one particular hardware based TCI comprises allocating the one or more job slots responsive at least in part to a request from the TCI driver.

11. An apparatus, comprising: at least one processor to:

allocate, at least in part via execution of a particular job scheduler software component, one or more job slots comprising particular job slot circuitry of a particular hardware component to at least one particular hardware based task control interface (TCI) of one or more hardware based TCIs for the particular hardware component;

obtain, at least in part via execution of a software component for the at least one particular hardware based TCI, one or more particular job descriptors, the software component for the at least one particular hardware based TCI to comprise a TCI driver;

store, at least in part via execution of the software component for the at least one particular hardware based TCI, the obtained one or more particular job descriptors in the respective one or more job slots, wherein the particular job scheduler software component is prevented from viewing or modifying the one or more particular job descriptors;

perform, at least in part via the particular hardware component, a particular task specified, at least in part, by at least one of the one or more particular job descriptors; and revoke, at least in part via execution of the particular job scheduler software component, the one or more job slots responsive at least in part to a job slot release request from the TCI driver.

12. The apparatus of claim 11, wherein, to allocate the one or more job slots to the at least one particular hardware based TCI, at least in part via execution of the particular job scheduler software component, the processor further to assign one or more respective priority values to the one or more job slots.

13. The apparatus of claim 12, wherein, to perform the particular task specified, at least in part, by the one or more particular job descriptors, the particular hardware component to select the particular task based at least in part on the one or more respective priority values assigned to the one or more job slots.

14. The apparatus of claim 11, wherein the one or more hardware based TCIs comprise a plurality of hardware based TCIs, and wherein the at least one processor to associate the plurality of hardware based TCIs with the particular job scheduler software component.

15. The apparatus of claim 11, wherein the software component for the at least one particular TCI comprises a TCI driver operating in a non-secure security state, a secure security state or a realm security state.

16. The apparatus of claim 11, wherein the software component for the particular hardware based TCI to comprise a TCI driver and wherein, to allocate the one or more job slots to the at least one particular hardware based TCI, the processor to, at least in part via execution of the particular job scheduler software component, allocate the one or more job slots responsive at least in part to a request from the TCI driver.

17. An article, comprising: a non-transitory computer-readable medium having stored thereon one or more instructions executable by a computing device to:

allocate, at least in part via execution of a particular job scheduler software component, one or more job slots comprising particular job slot circuitry of a particular hardware component to at least one particular hardware based task control interface (TCI) of one or more hardware based TCIs for the particular hardware component;

obtain, at least in part via execution of a software component for the at least one particular hardware based TCI, one or more particular job descriptors, the software component for the at least one particular hardware based TCI to comprise a TCI driver;

store, at least in part via execution of the software component for the at least one particular hardware based TCI, the obtained one or more particular job descriptors in the respective one or more job slots, wherein the particular job scheduler software component is prevented from viewing or modifying the one or more particular job descriptors;

perform, at least in part via the particular hardware component, a particular task specified, at least in part, by at least one of the one or more particular job descriptors; and revoke, at least in part via execution of the particular job scheduler software component, the one or more job slots responsive at least in part to a job slot release request from the TCI driver.

18. The article of claim 17, wherein, to allocate the one or more job slots to the at least one particular hardware based TCI, at least in part via execution of the particular job scheduler software component, the non-transitory computer-readable medium to have stored thereon further instructions executable by the computing device to assign one or more respective priority values to the one or more job slots.

* * * * *